United States Patent [19]
Herbst

[11] Patent Number: 5,423,962
[45] Date of Patent: Jun. 13, 1995

[54] ELECTROLYTIC TREATMENT APPARATUS

[76] Inventor: Robert Herbst, 3550 S. Harlan #345, Denver, Colo. 89235

[21] Appl. No.: 229,028

[22] Filed: Apr. 18, 1994

[51] Int. Cl.⁶ .............................................. C02F 1/463
[52] U.S. Cl. .................... 204/149; 204/152; 204/186; 204/275; 204/302
[58] Field of Search ............... 204/152, 186, 275, 302, 204/149

[56] References Cited

U.S. PATENT DOCUMENTS

| | | | |
|---|---|---|---|
| 672,231 | 4/1901 | Lacomme | 204/275 |
| 820,113 | 5/1906 | Hinkson | 204/272 |
| 2,864,750 | 12/1958 | Hughes | 204/149 |
| 3,247,091 | 4/1966 | Stuetzer | 204/302 |
| 3,314,872 | 4/1967 | Waterman et al. | 204/302 |
| 3,972,795 | 8/1976 | Goens | 204/269 |
| 4,175,026 | 11/1979 | Houseman | 204/272 |
| 4,347,110 | 8/1982 | Joyce et al. | 204/149 |
| 4,378,276 | 3/1983 | Liggett | 204/149 |
| 4,790,923 | 12/1988 | Stillman | 204/268 |
| 4,872,959 | 10/1989 | Herbst | 204/109 |
| 5,043,050 | 8/1991 | Herbst | 204/272 |

*Primary Examiner*—John Niebling
*Assistant Examiner*—Arun S. Phasge
*Attorney, Agent, or Firm*—Patnaude, Videbeck & Marsh

[57] ABSTRACT

Polarizing conductive conduits are mechanically and electrically mounted to respective ones af a pair of electrodes to which a voltage source is connected to establish an electric field between the electrodes. Liquid to be purified is first passed through one or more of said conduits and then passed between said electrodes to precipate or coagulate materials contained in said liquid.

7 Claims, 1 Drawing Sheet

ELECTROLYTIC TREATMENT APPARATUS

The present invention relates in general to the electrolytic treatment of liquids, and it relates in particular to new and improved apparatus for the electrolytic treating of aqueous solutions to cause impurities in the solutions to coagulate or otherwise precipitate out of the solution.

BACKGROUND OF THE INVENTION

In U.S. Pat. Nos. 4,293,400, 4,378,276, 4,872,959, and 5,043,050 there are described electrolytic treatment devices which apply an electric field to a liquid which flows between electrodes incorporated in the devices. In some of these devices, the electrodes are metal tubes or pipes whose sizes are predetermined by the sizes of pipe which are commercially available. In the device disclosed in the later patent the electrodes are flat, and while this apparatus provides a substantial advantage over the earlier tubular designs, it was found that when this invention was embodied in very large treatment devices it was difficult to adequately seal the edges of the unit particularly after long periods or use and shutdown. Moreover, uneven liquid flows between the electrodes sometimes causes plugging on the side with the lower flow rate followed by a resistive bridge of the plugged material which can lead to heat buildup in the treatment unit.

While the above referenced patents disclose electrolytic treatment devices which demonstrate the successful use of an electromotive force to drive chemical reactions and which are useful in the purification of liquid solutions, they have the added advantage of enabling the control of the reactions by permitting adjustment of the spacing between the electrodes, the level of the voltage applied across the electrodes and thus the strength of the current passing through the solution being treated. Moreover, the chemicals in the solution available to be reacted in the treatment device can be controlled. However, even though these prior art systems thus provide for a substantial amount of flexibility in their operation, it would be desirable to provide an electrolytic treatment system which could be operated to favor the removal of a high percentage of a particular material in the solution being treated.

SUMMARY OF THE INVENTION

Briefly, there is provided in accordance with the present invention a new and improved electrolytic treatment apparatus in which the liquid to be treated is initially passed through a polarizing electric field before being passed through a chamber located between two electrodes across which a polarized voltage is applied to establish a polarized electric field in the chamber through which the liquid flows. In a preferred embodiment of the invention the polarizing field is established in a conductive conduit through which the liquid is passed upstream of the treatment chamber between a pair of flat electrodes between and through which the liquid is subsequently passed to precipitate or to coagulate materials out of the liquid solution being treated. The voltage difference between the conductive polarizing conduit and the electrodes defining the treatment chamber, and the polarity of the voltage applied to the polarizing conduit relative to the polarity of the electric field between the electrodes may be selected to control the reaction which takes place in the liquid and which results in the floculation or coagulation of the material to be separated from the liquid carrier.

Improved results have been obtained by using two polarizing conduits respectively associated with the two electrodes and by alternating the flow through these two conduits as the D.C. voltages on the electrodes are alternated between positive and negative.

BRIEF DESCRIPTION OF THE DRAWINGS

For a more complete and better understanding of the invention reference should be made to the following detailed description of the invention taken in connection with the accompany drawings wherein.

DETAILED DESCRIPTION OF A PREFERRED EMBODIMENT

Figure 1:
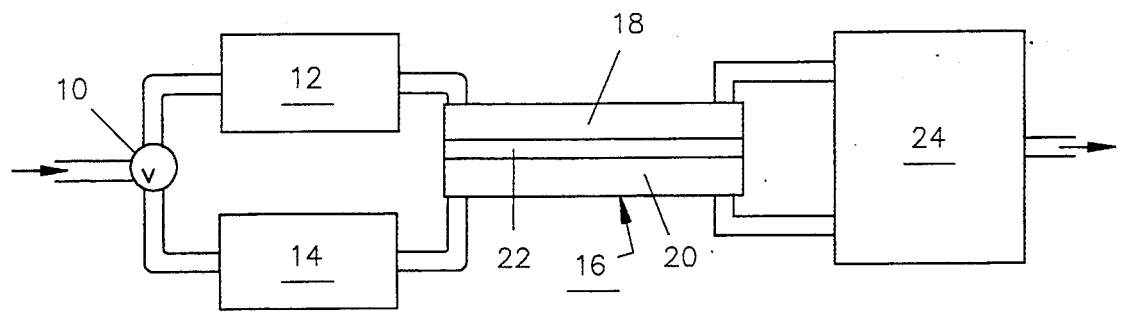
FIG. 1 is a block diagram of an electrolytic treatment system embodying the present invention.

Referring to the drawings and particularly to FIG. 1 thereof, there is shown a schematic block diagram of a system for the electrolytic treatment of liquid to precipitate or coagulate one or more materials from the liquid being treated. As there shown, the liquid to be treated is directed by a three-way valve 10 to either or both of a pair of polarizing units 12 and 14 and then through an electrolytic treatment unit 16 which includes a pair of electrodes 18 and 20 which are held in spaced apart relationship by an electric insulating gasket member 22. The gasket may be bonded to the electrodes or suitable bolts or clamps, not shown, may be used to secure the electrodes to the gasket. Materials in the liquid which are precipitated or coagulated as the liquid passes through the chamber between the electrodes in the device 16 and are carried by the liquid to a filter 24 or other suitable separation device such, for example, as a centrifuge or a settling pond, from the outlets of the device 16. Consequently, the precipitated or coagulated solids are thus separated and removed from the liquid.

Preferably, unidirectional voltages are applied to the electrodes 18 and 20 to provide a unidirectional potential difference across the chamber located between the electrodes and surrounded by the gasket 22. In addition, unidirectional voltages are applied to the polarizing devices 12 and 14, which in a preferred embodiment of the invention are metal pipes. The polarizing devices are electrically insulated from the valve 10 and from each other. For some applications of the invention it is not necessary to electrically insulate the devices 12 and 14 from the electrodes 18 and 20 as, for example, where the voltage of a polarizing device is at the same level as is the electrode to which the polarizing device is connected. However, in other applications it may be found that higher polarizing voltages on the polarizing devices than those applied to the electrodes gives better results, i.e., a more efficient operation of the electrolytic purification device 16.

In order to equalize the depletion of the electrodes 18 and 20, to remove scale from the electrodes, and in some cases to remove metal plating from the electrodes, it is desirable to periodically reverse the polarity of the voltage applied between the electrodes. I have found that the polarity of the polarizing device through which the liquid is passed on the way to the device 16 should also have the polarity of the voltage applied thereto reversed when the polarity of the voltage applied between the electrodes is reversed. Ordinarily the liquid being treated is passed through only one of the polarizing devices 12 and 14 at any given time, but under some circumstances, such, for example, as for cleaning the chamber, it may be desirable to equalize the flow of liquid through both of the polarizing devices 12 and 14.

Figure 2:
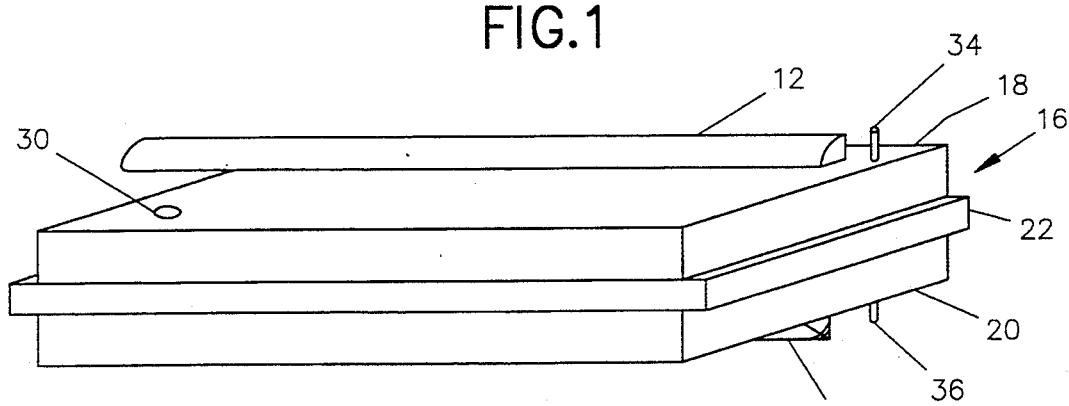
FIG. 2 is an isometric view of an electrolytic treatment apparatus embodying the present invention.
Figure 3:
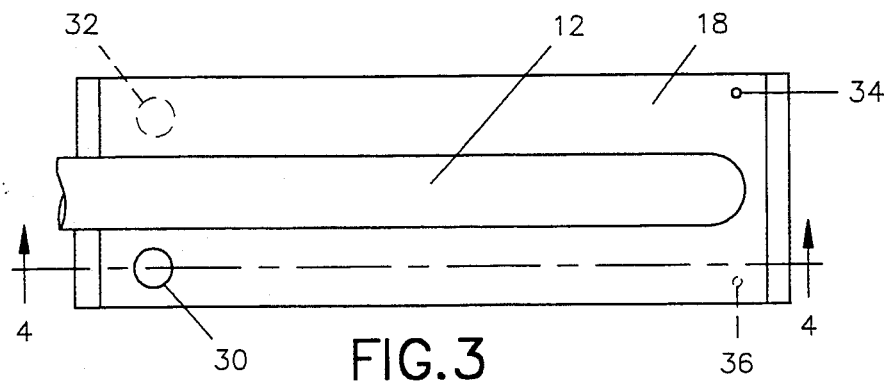
FIG. 3 is a plan view of the apparatus of FIG. 2.
Figure 4:
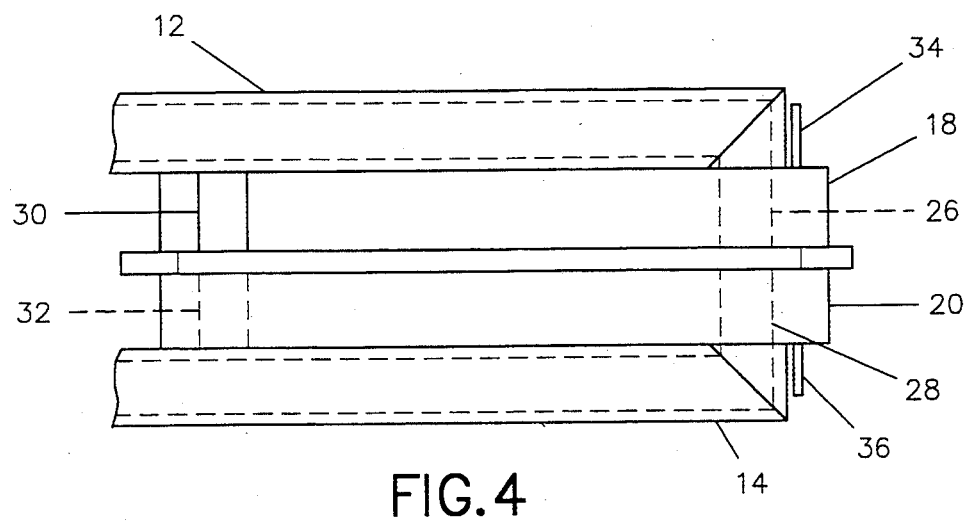
FIG. 4 is a cross-sectional view of the apparatus of FIG. 3 taken along the line 4—4 thereof.

Refer now to FIGS. 2 through 4 wherein is shown a preferred embodiment of the invention wherein the polarizing devices 12 and 14 are metal tubes welded directly to respective ones of a pair of electrode plates 18 and 20. The electric insulating gasket 22 and the electrodes 18 and 20 are generally rectangular and as best seen in FIG. 4, define a relatively thin, elongate chamber therebetween through which the liquid being treated flows from one or the other or both of a pair of liquid inlet ports 26 and 28 which respectively extend through the electrodes 18 and 20 in line with the openings through the pipes 12 and 14 near one end of the treating chamber. As may be seen, the liquid inlets 26 and 28 are in proximity to one end of the treatment chamber, and a pair of liquid outlet ports 30 and 32 extend respectively through the electrodes 18 and 20 in proximity to the other end of the chamber. Both of these outlet ports need not be used but two are provided for ease of installation. It will be seen that the liquid being treated flows through the electric field established between the electrodes as it passes from one end of the chamber to the other.

In this embodiment of the invention each electrode plate and one of the polarizing tubes are electrically connected together. Accordingly, both the electrode and the associated polarizing tube are maintained at the same voltage relative to the other polarizing tube and electrode. A pair of electric terminals 34 and 36 are provided with each of the terminals being connected respectively, as shown, to the electrodes 18 and 20 to facilitate the connection of voltages to the electrodes.

When a unidirectional voltage is applied across the electrodes 18 and 20, the one of the electrodes functioning as the anode becomes the sacrificial electrode, and it thus becomes desirable to periodically reverse the voltage difference between the electrodes so that both electrodes are depleted more or less equally. I have found that when the polarity of the voltage applied between the electrodes is reversed, improved results are achieved by simultaneously switching the flow of liquid to the device 16 from one of the polarizing tubes 18, 20 to the other.

Although best results have been achieved by the use of a unidirectional voltage difference between the electrodes, alternating voltage may also be used. Indeed, I have found that varying the frequency of an alternating voltage applied to the electrodes improves the removal of certain anions and cations from the liquid being treated. Similarly, when unidirectional voltage pulses are applied to the electrodes to the polarizing tubes varying the frequency of the pluses affects the removal of different ions from the liquid being treated. Reversing the polarity at the rate of 30 to 150 times per second has provided satisfactory results.

I have found that the use of iron pipes for the polarizing devices 12 and 14 has worked well when removing copper and nickel from an aqueous solution. For treating metal plating solutions, iron and aluminum electrodes function well when the voltage difference between the electrodes is about four volts and the current between the electrodes is twenty amps.

While the present invention has been described in connection with certain embodiments, it will be understood that those skilled in the art may make many changes and modifications without departing from the true spirit and scope of the invention. Therefore, it is intended by the appended claims to cover all such changes and modifications which come within the true spirit and scope of the invention.

What I claim is:

1. A method of electrolytically treating a liquid, comprising the steps of
   first passing said liquid through an elongate conductive conduit having an electric potential different from ground potential and with said liquid passing through said conduit in contact with the inner wall thereof,
   then passing said liquid through an electric field established between an anode having a first potential and a cathode having a second potential different from said first potential, and
   then treating said liquid to remove therefrom solids entrained therein.

2. The method according to claim 1 wherein
   the potential of said conductive member is of the same polarity as that of one of said electrodes.

3. The method according to claim 2 further comprising the step of
   electrically connecting said conductive member to said one of said electrodes.

4. Electrolytic treatment apparatus comprising in combination
   first and second electrodes mounted in spaced apart relationship,
   an elongate conductive conduit,
   means for applying voltages to said electrodes and to said conduit, and
   means for passing a liquid through said conduit and then through the space between said electrodes.

5. Electrolytic treatment apparatus according to claim 4 wherein
   said electrodes are metallic plates.

6. The invention according to claim 5 comprising
   an electric insulating gasket positioned between said electrodes and defining with said electrodes an elongate electrolytic treatment chamber,
   a liquid inlet in proximity to one end of said chamber, and
   a liquid outlet in proximity to the other end of said chamber.

7. The invention according to claim 6 comprising
   a second conductive conduit,
   said conduits being mechanically mounted to and electrically connected to respective ones of said electrodes.

* * * * *